US006532369B1

(12) United States Patent
Myer

(10) Patent No.: US 6,532,369 B1
(45) Date of Patent: Mar. 11, 2003

(54) SYSTEM AND METHOD FOR MOBILE CONTROLLED DIRECT MODE WIRELESS LOCAL CALLING

(75) Inventor: Robert E. Myer, Morris, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/377,815

(22) Filed: Aug. 20, 1999

(51) Int. Cl.⁷ .................................................. H04Q 7/20
(52) U.S. Cl. ...................................... 455/517; 455/509
(58) Field of Search .................................. 455/517, 445, 455/515, 88, 465, 464, 92, 70, 71, 509

(56) References Cited

U.S. PATENT DOCUMENTS

| | | | | |
|---|---|---|---|---|
| 5,636,243 A | * | 6/1997 | Tanaka | 370/311 |
| 5,666,661 A | * | 9/1997 | Grube et al. | 455/509 |
| 5,781,860 A | | 7/1998 | Lopponen et al. | |
| 6,006,102 A | * | 12/1999 | Touzeau | 340/825.24 |
| 6,069,925 A | * | 5/2000 | Koh | 375/344 |
| 6,167,260 A | * | 12/2000 | Azam et al. | 455/426 |
| 6,208,844 B1 | * | 3/2001 | Abdelgany | 342/357.12 |
| 6,289,218 B1 | * | 9/2001 | Liu | 370/503 |

FOREIGN PATENT DOCUMENTS

| | | |
|---|---|---|
| EP | 700167 A1 | 3/1996 |
| EP | 756432 A2 | 1/1997 |
| EP | 756432 A3 | 4/1997 |
| JP | 06085739 | 3/1994 |

* cited by examiner

Primary Examiner—Thanh Cong Le
Assistant Examiner—Nick Corsaro
(74) Attorney, Agent, or Firm—Harnes, Dickey & Pierce, P.L.C.

(57) ABSTRACT

A wireless communications technique enables direct call set up and communication between wireless subscribers without involving network infrastructure. A mobile is modified to perform like a network base station during a local calling mode initiated by a user, thereby reversing transmit and receive frequency bands and allowing the mobile to set up and carry out a call as if it were a network base station. The mobile initially performs a communication channel or frequency sweep sequence to determine an idle traffic channel, thereby preventing interference with other subscribers. After a local call is established, the transceiver monitors call quality, and performs another communication channel or frequency sweep sequence to select a new traffic channel when call quality drops below a threshold level to ensure a certain level of call quality between the first and second mobiles.

17 Claims, 5 Drawing Sheets

SYSTEM AND METHOD FOR MOBILE CONTROLLED DIRECT MODE WIRELESS LOCAL CALLING

BACKGROUND OF THE INVENTION

1. Field of the Invention

The present invention relates to the field of wireless communications.

2. Description of Related Art

A typical wireless communications network, such as a cellular or a personal communication system (PCS) network, includes three main elements: (1) a mobile telephone switching office (MTSO) which serves as an interface between the wireless network and the public switched telephone network (PSTN); (2) a number of cell cites, or "base stations," which transmit/receive radio frequency (RF) signals, including control information and traffic, to/from mobile subscriber terminals ("mobiles"); and (3) a number of mobiles distributed throughout the geographic region served by the wireless network. Each base station provides service for a sub-area of the network region, and is connected to the MTSO. The MTSO manages channel allocation for each base station, coordinates between moving subscribers and base stations to control handoffs, and controls the operation of establishing connections between mobiles and PSTN terminals.

To allow a mobile subscriber terminal to simultaneously receive and transmit, a typical wireless network uses a first frequency band for forward link communication, i.e., base station to mobile, and a second frequency band for reverse link communication, i.e., mobile to base station. Furthermore, the wireless network typically relies on two types of channels—traffic channels for carrying voice frequency communication, and control channels for carrying control information used by the MTSO and base stations to establish and monitor call connections and to manage handoffs between base stations as subscribers move through adjacent cells.

When a mobile is switched on, it initially scans a number of forward link set-up channels, such as paging or pilot channels (in Code Division Multiple Access (CDMA) networks), and selects a single forward link set-up channel, normally associated with the nearest base station, based on the relative quality of the channel. When establishing a call connection between a mobile and a PSTN terminal or another mobile, the MTSO assigns a traffic channel to the mobile and instructs the mobile, via the serving base station, the traffic channel which has been assigned. Subsequently, communication between the mobile and the PSTN terminal or other mobile is carried out via the serving base station, the MTSO, and the PSTN (for communication with a PSTN terminal).

Such traffic routing through at least one serving base station and the MTSO occurs even for communication between mobiles which are near one another, thereby tying up network resources, and often resulting in network charges, regardless of the proximity between communicating subscribers.

SUMMARY OF THE INVENTION

The present invention is a wireless communications technique which enables a first mobile to directly communicate with a second mobile located within a certain range by executing call set-up and communication functions normally associated with a network base station. The present invention is also a mobile which is equipped to perform like a network base station during a local calling mode to establish and control direct connection between mobiles without contacting a network base station. In this way, the mobile enables local communication without incurring subscriber network charges or tying up network resources.

In one embodiment, a mobile is equipped to reverse transmit and receive frequencies or communication channels during a local calling mode, thereby enabling the mobile to transmit/receive control information and carry out a call with a locally positioned mobile as if it were a base station. In one implementation, the mobile executes a communication channel or frequency sweep operation to identify an idle traffic channel, and thereby minimize interference. When establishing a connection with a local mobile, the mobile pages the local mobile over the forward link set-up channel designated for the base station serving the local mobile, to which the local mobile responds over a reverse link set-up channel (e.g., an access channel). After selecting an appropriate traffic channel, the mobile informs the local mobile of the selected traffic channel via the forward link set-up channel, thereby prompting the local mobile to tune to the designated traffic channel. After successfully establishing the call connection, the mobile transmits a data message over the traffic channel to alert the local mobile user of an incoming call. When the local mobile answers by going "off-hook," a talking connection is established between the mobiles.

In one implementation, the mobile monitors call quality, selects a new traffic channel when call quality drops below a certain threshold, for example based on signal-to-noise ratio or bit error rate, and instructs the local mobile of the new traffic channel via the control channel. Thus, the mobile sets up and carries out a call between local parties without contacting the network base station.

BRIEF DESCRIPTION OF THE DRAWINGS

Other aspects and advantages of the present invention will become apparent upon reading the following detailed description, and upon reference to the drawings, in which.

DETAILED DESCRIPTION

The present invention is a wireless communications technique which enables a first mobile to establish a direct connection with a second mobile within a local calling range without relying on network infrastructure. The present invention is also a mobile which is equipped to perform call set-up and communication functions normally associated with a network base station during a local calling mode to establish and control direct connection with another mobile. Illustrative embodiments of a wireless communications technique and mobile according to the present invention, are described below.

Figure 1:
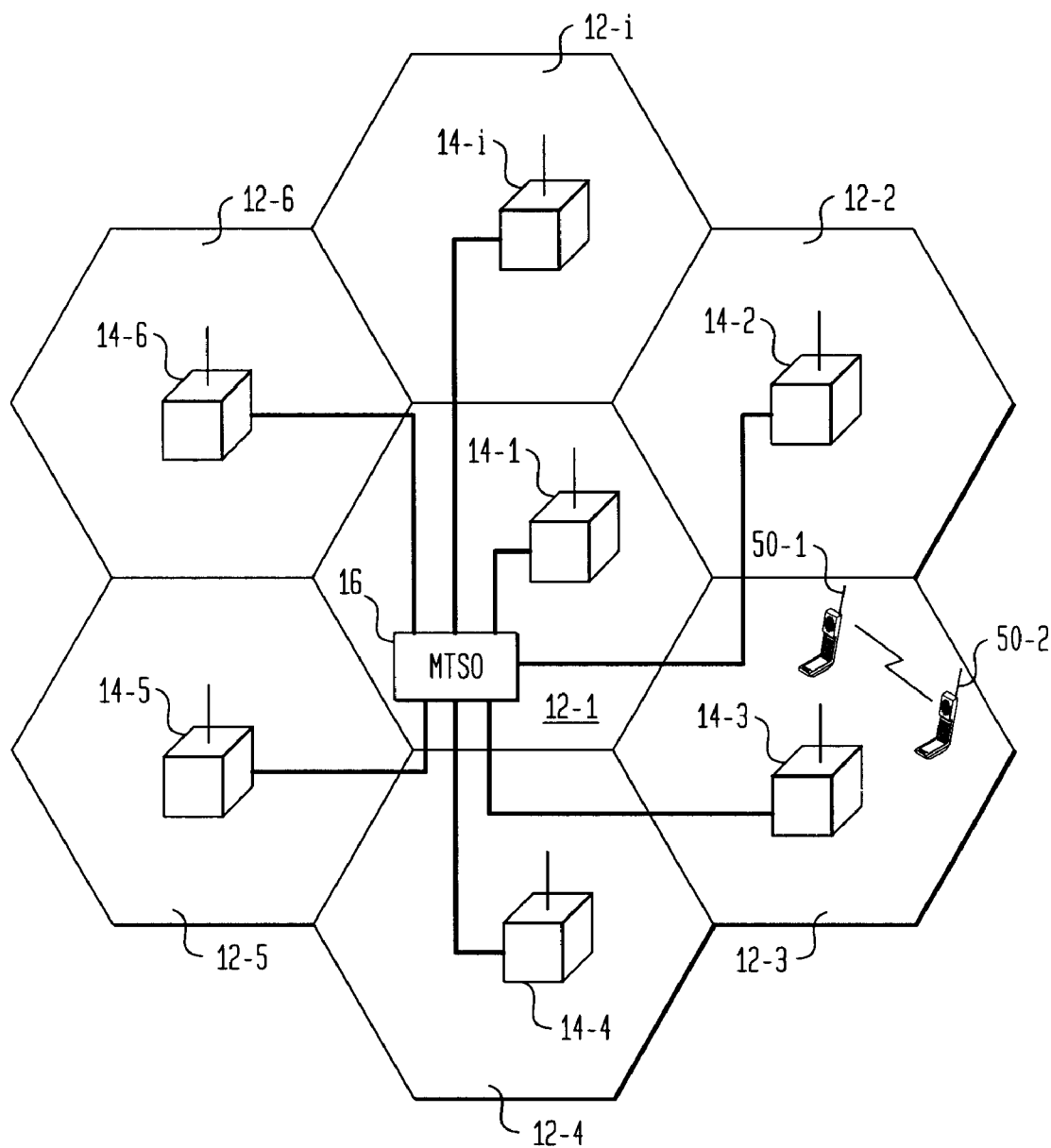
FIG. 1 illustrates an exemplary wireless network configuration suitable for implementing embodiments of the present invention.

Referring to FIG. 1, there is shown a wireless network configuration 10 suitable for implementing embodiments of the present invention. The wireless network configuration 10 includes a plurality of geographic sub-areas ("cells") 12-1, . . . , 12-i. Each cell 12-1, . . . , 12-i has a corresponding base station 14-1, . . . , 14-i for providing communication service to mobiles located therein. Each of the base stations 14-1, . . . , 14-i is connected (e.g., via a trunk line) to an MTSO 16, which manages communication within the network and serves as an interface between the wireless network 10 and the PSTN (not shown).

As will be apparent to those skilled in the art, many variations on the wireless network 10 illustrated in FIG. 1 are possible. For example, each of the cells 12-1, . . . , 12-i may be divided into a plurality of sectors. Furthermore, although the cells 12-1, . . . , 12-i are shown as hexagonal areas, different cell shapes are possible.

As described above, mobiles within the wireless network area scan a plurality of forward link set-up channels respectively corresponding to different base stations, and select a serving base station, normally the nearest base station, based on relative forward link set-up channel quality. Referring again to FIG. 1, a first mobile 50-1 and a second mobile 50-2, both located in cell 12-3, select base station 14-3 as their serving base station. To enable direct communication, at least the first mobile 50-1 is equipped with a mobile transceiver such as the exemplary mobile transceiver described below.

Figure 2:
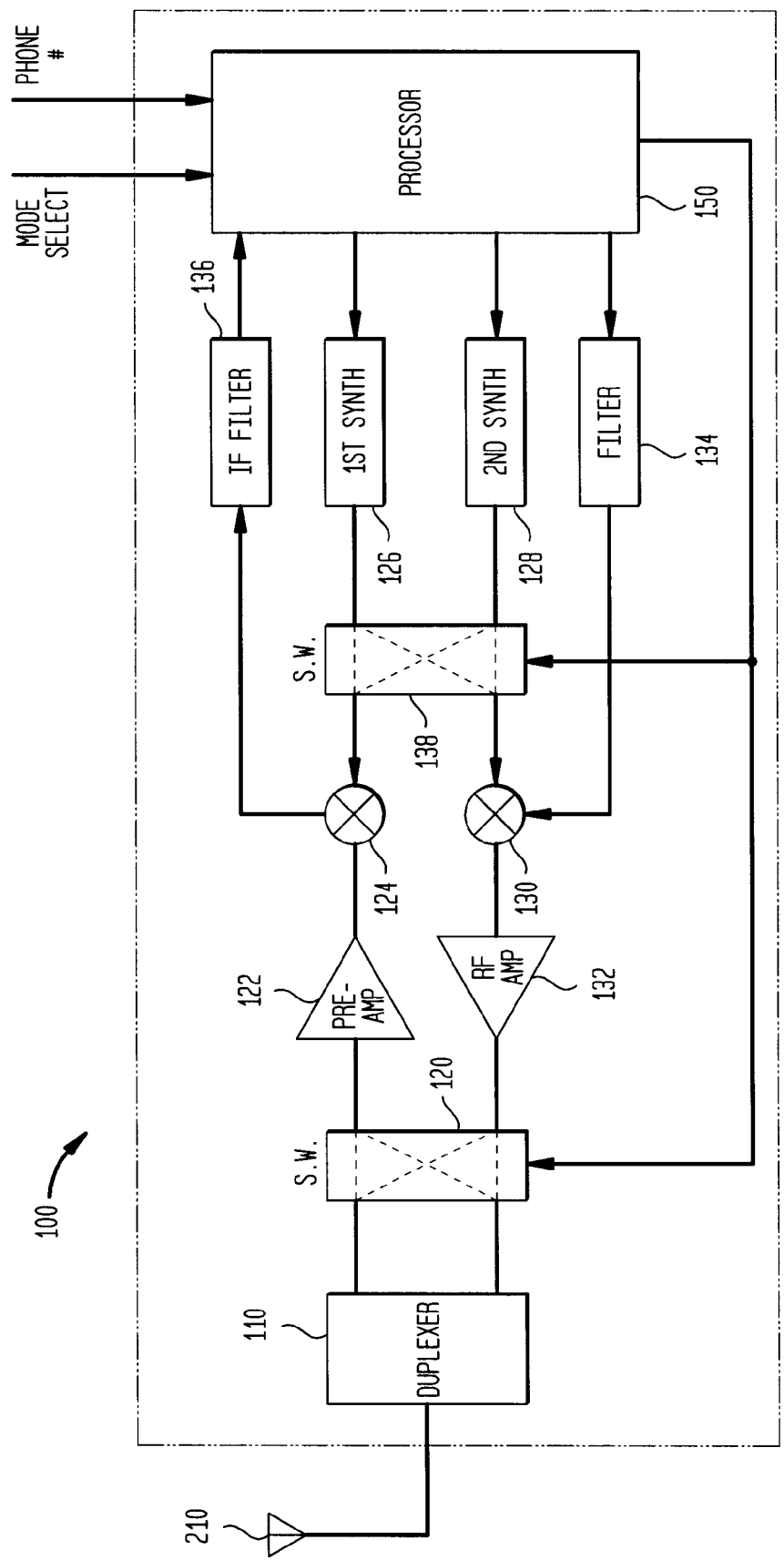
FIG. 2 is a block diagram depicting certain elements of a mobile transceiver according to an embodiment of the present invention.

FIG. 2 is a block diagram of a mobile transceiver 100 of the first mobile 50-1 in accordance with an embodiment of the present invention which enables direct local communication with another mobile by performing base station call set-up and communication functions during a local calling mode. As shown in FIG. 2, the mobile transceiver 100 includes a duplexer 110 connected to an antenna 210, a first switch 120 connecting the duplexer 110 to a reception pre-amplifier 122 and a transmit RF amplifier 132, a reception mixer 124 connected to the output of the pre-amplifier 122, an intermediate frequency (IF) filter 136 connected to the output of the mixer 124, a processor 150 connected to the output of the IF filter 136, and further connected to a first frequency synthesizer 126, a second frequency synthesizer 128, a transmit filter 134, the first switch 120, and a second switch 138. The second switch 138 selectively connects the first frequency synthesizer 126 and the second frequency synthesizer 128 to the reception mixer 124 and a modulator 130, which is connected to the output of the transmit filter 134. The RF amplifier 132 is connected to the output of the modulator 130.

The duplexer 110 is connected to the antenna 23 to receive/transmit RF signals. As is well known in the art, frequency division duplexing allows a mobile user to simultaneously listen and speak by transmitting and receiving at frequencies in separate frequency bands, i.e., mobile receive and mobile transmit bands which respectively correspond to base station transmit and base station receive bands.

Figure 3:
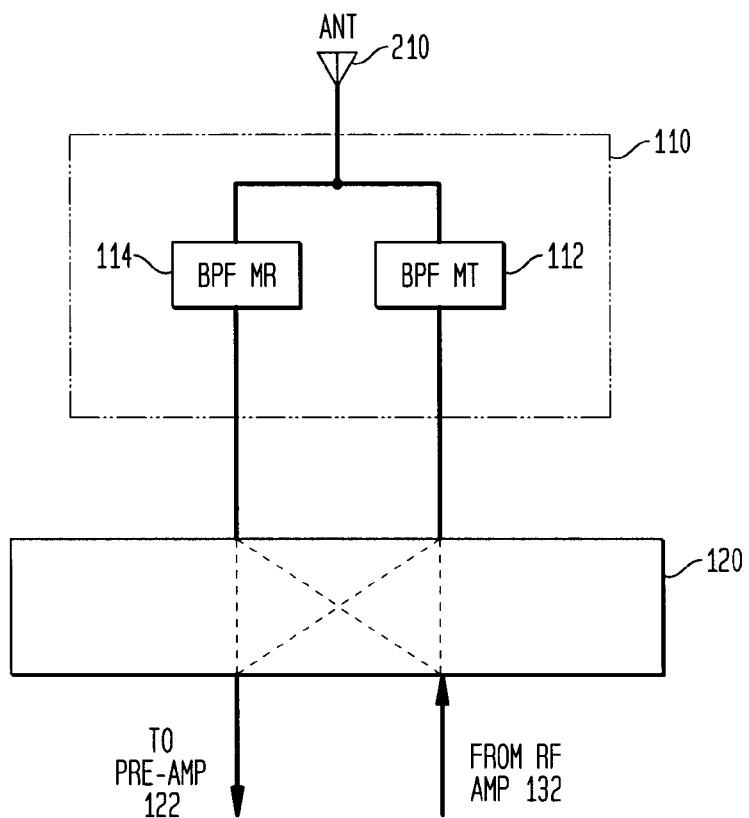
FIG. 3 illustrates an exemplary duplexer configuration for removing frequency components outside the mobile transmit and mobile receive frequency bands.

FIG. 3 illustrates a typical duplexer configuration which is suitable for implementing the duplexer 110 in the mobile transceiver 100 shown in FIG. 2. As illustrated in FIG. 3, the duplexer 110 includes a mobile transmit band pass filter (BPF MT) 112, which filters out frequencies in an RF signal which are above and below the mobile transmit band boundaries, and is connected to the antenna 210 and the first switch 120. The duplexer 110 further includes a mobile receive band pass filter (BPF MR) 114, which filters out frequencies above and below the normal mobile receive band boundaries, and is also connected to the antenna 210 and the first switch 120.

Figure 4:
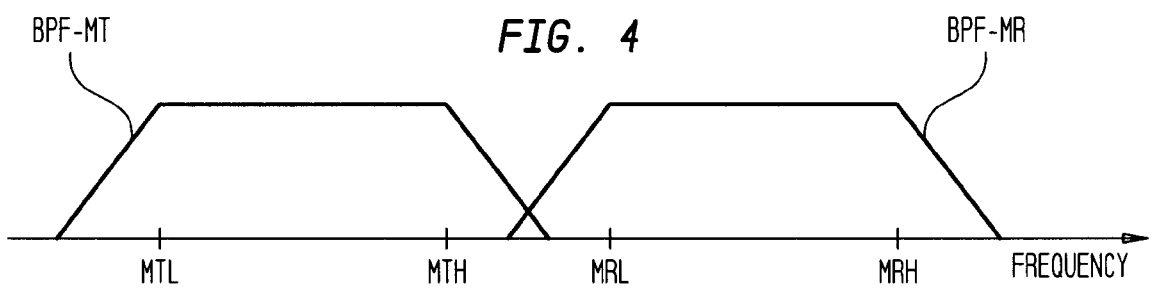
FIG. 4 illustrates exemplary mobile transmit and mobile receive frequency bands, which are reversed by the mobile transceiver in a local calling mode according to an embodiment of the present invention.

FIG. 4 illustrates typical filtering results of the duplexer 110. In FIG. 4, the lower boundary of the mobile transmit band is designated as MTL (mobile transmit low), the upper mobile transmit boundary is designated as MTH (mobile transmit high), the lower boundary of the mobile receive band is designated as MRL (mobile receive low), and the upper boundary of the mobile receive band is designated as MRH (mobile receive high).

Referring again to FIG. 2, the mobile transceiver 100 includes a configuration for performing typical mobile RF transmission/reception, and also includes switches 120 and 138 which, upon receiving a control output from the processor 150, enable the transceiver 100 to function as a base station. During normal operation, i.e., during communication involving at least one base station and the MTSO 16, the processor 150 controls the first switch 120 to connect the BPF MR 114 of the duplexer 110 with the pre-amplifier 122 so that the mixer 124 receives an RF signal in which the frequencies outside the normal mobile receive band MRL-MRH have been filtered out. Furthermore, the processor 150 controls the second switch 138 to connect the output of the first frequency synthesizer 126 to the mixer 124 during normal operation. The first frequency synthesizer 126 converts a reference oscillating frequency signal from a reference oscillator (not shown) to generate a local oscillating (LO) signal which, when mixed with the amplified RF signal by the reception mixer 124, results in an intermediate frequency (IF) suitable for subsequent demodulation. The IF signal output by the mixer 124 is filtered by the IF filter 136 and output to the processor 150 for demodulation to recover communication.

During normal operation, the first switch 120 also connects the BPF MT 112 of the duplexer 110 to the RF amplifier 132 so that amplified RF signals from the RF amplifier 132 are band pass filtered in accordance with the normal mobile transmit band MTL-MTH. The processor 150 further controls the second switch 138 to connect the second frequency synthesizer 128 to the modulator 130 during normal operation. The second frequency synthesizer provides the modulator 130 with a carrier signal at an assigned frequency in the normal mobile transmit band (corresponding to the selected traffic channel communicated by the serving base station). The modulator 130 modulates the carrier signal received from the second frequency synthesizer 128 with a signal received from the filter 134, which low pass filters the output of the processor 150, and outputs the modulated carrier signal to the RF amplifier 132 so that the modulated carrier signal is amplified before output to the duplexer 110. It will be apparent to those skilled in the art that the mobile transceiver configuration illustrated in FIG. 2 may be modified in various ways, and may include additional conventional components, such as additional mixing stages, amplifiers, and filters.

Figure 5:
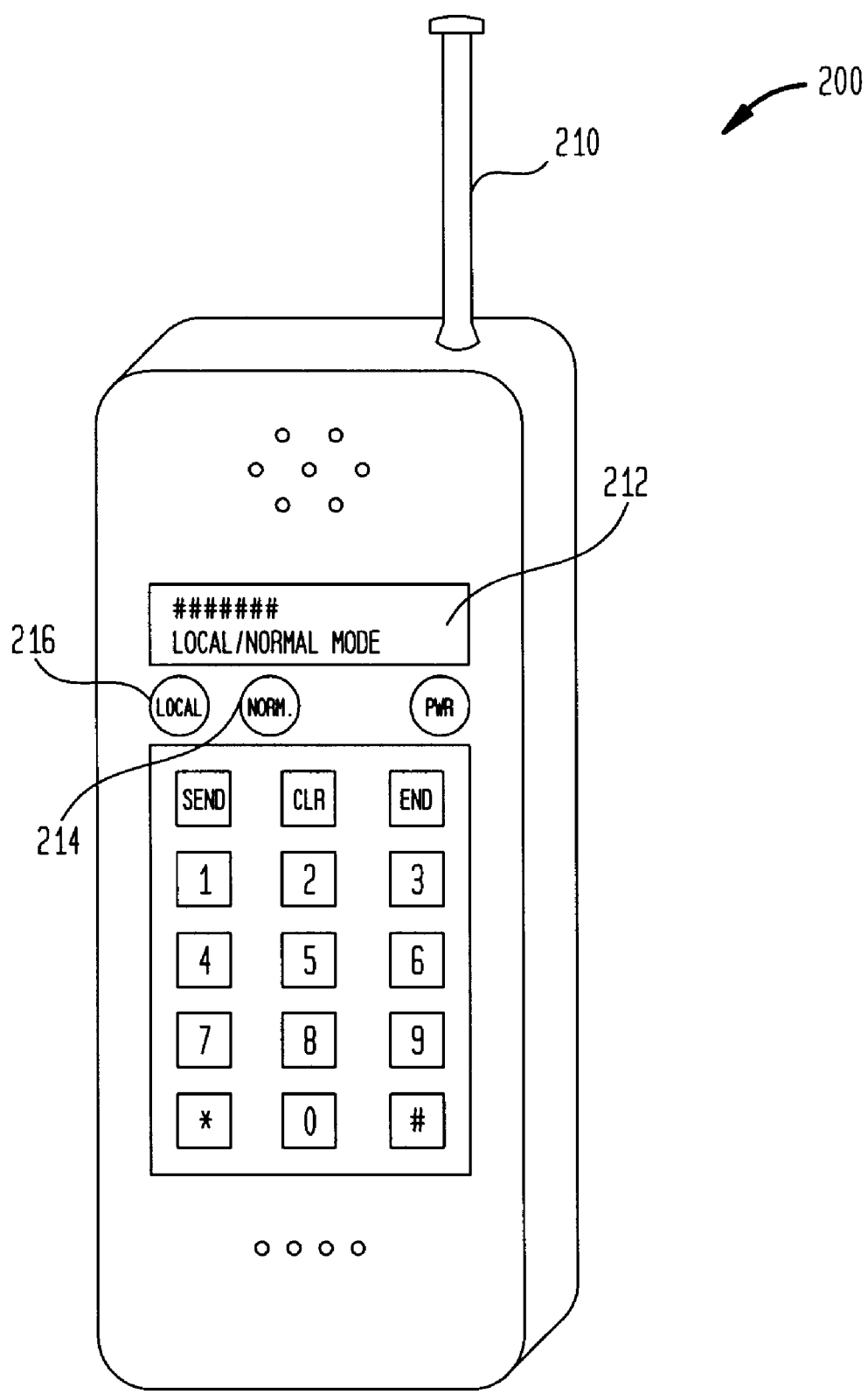
FIG. 5 illustrates mobile hand set features according to an embodiment of the present invention.

As illustrated in FIG. 5, an exemplary mobile hand set 200 according to an implementation of the present invention includes a local calling mode select button 216 and a normal operation select button 214 (for selecting normal wireless communication involving the base station and MTSO). The mobile hand set 200 further includes a display region 212 which indicates the current mode of operation. The processor 150 receives a mode select signal based on the selection of either the local calling mode select or normal operation select buttons 216 and 214.

Upon receiving a local calling mode select signal, which indicates that the user has selected the local calling mode select button 216 to initiate the local calling mode, the processor 150 controls the first switch 120 to connect the pre-amplifier 122 to the BPF MT 112 of the duplexer 110, and the output of the RF amplifier 132 with the BPF MR 114 of the duplexer 110. In this way, the reception circuitry of the mobile transceiver receives signals in which the frequency components outside the normal mobile transmit band MTL-MTH have been removed, and the RF signal to be transmitted, output from the RF amplifier 132, is filtered by the duplexer 110 to remove components outside the normal mobile receive band MRL-MRH. Accordingly, the first switch 120 serves to reverse the transmit and receive frequency bands of the transceiver 100 to those of a base station.

Furthermore, the processor 150 controls the second switch 138 so that the reception mixer 124 receives an LO signal from the second frequency synthesizer 128 which results in an IF frequency in the normal mobile transmit band MTL-MTH, and the modulator 130 receives a carrier signal from the first synthesizer 126 having a frequency in the normal receive band MRL-MRH. By switching the input of the mixer 124 to a frequency output by the second frequency synthesizer 128, and switching the carrier signal input to the modulator 130 to a frequency from the first frequency synthesizer 126, reception/transmission is carried out at base station transmit/receive frequencies.

Figure 6:
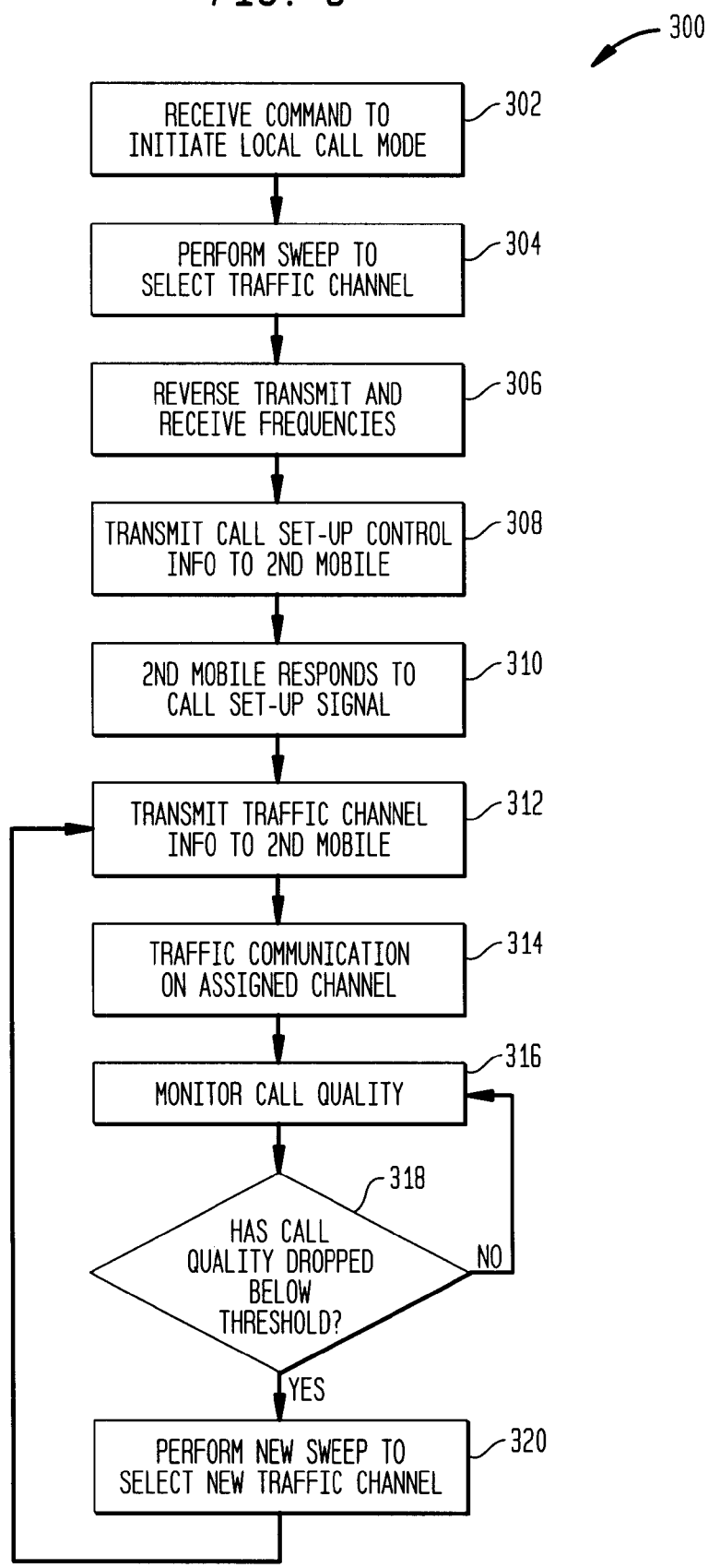
FIG. 6 is a flow diagram illustrating the steps for establishing and controlling direct communication between locally positioned mobiles during a local calling mode in accordance with an embodiment of the present invention.

Operation of an embodiment of the present invention will next be described with reference to the flow diagram of FIG. 6. For illustrative purposes, the following description uses the example of the first mobile 50-1 shown in FIG. 1 calling the second mobile 50-2. Initially, when the user of the first mobile 50-1 chooses to attempt a local mobile-to-mobile call by selecting the local calling mode select button 216 of the handset 200, the processor 150 of the transceiver 100 receives a local calling mode select signal (Step 302). Next, in order to minimize interference during subsequent voice communication, the processor 150 initiates an analysis to find an idle traffic voice channel. More specifically, the processor 150 performs a communication channel or frequency sweep sequence. To perform a frequency sweep, the processor 150 controls the first synthesizer 126 to sequentially vary the LO signal over a range so that the IF signal generated by the mixer 124 varies over the range of frequency channels in the mobile receive band MRL-MRH, and selects an idle channel based on relative interference levels on the mobile receive channels (e.g., based on Receive Signal Strength Indicator (RSSI) measurements which are typically made by mobiles) (Step 304). In another embodiment, the base station 14-3 may assign traffic channels to the mobile 50-1 for communication with the second mobile 50-2.

Next, the processor 150 outputs a control signal to the first switch 120 and the second switch 138 to set the first switch 120 and the second switch 138 at local calling mode positions. As discussed above, in the local calling mode position, the first switch 120 connects the BPF MT 112 of the duplexer 110 to the pre-amplifier 122, and connects the output of the RF amplifier 132 to the BPF MR 114 of the duplexer 110, thereby reversing the filtering bands as compared to normal operation. As also described above, the second switch 138 in the local calling mode position connects the output of the first frequency synthesizer 126 to the modulator 130 so that the modulator 130 receives a carrier signal from the first frequency synthesizer 126. Furthermore the second switch 138 in the local calling mode position connects the output of the second frequency synthesizer 128 with the mixer 124 so that the mixer 124 receives an LO signal from the second frequency synthesizer 128 (Step 306).

It should be recognized that the processor 150 may reverse the mobile transmit and mobile receive frequency bands before selecting a traffic channel, in which case the processor 150 controls the second synthesizer 128 to generate a range of LO signals so that the IF signal generated by the mixer 124 varies over the range of frequency channels in the mobile transmit band MTL-MTH. In this alternative implementation, the processor 150 selects an idle channel based on relative interference levels on the mobile transmit channels (e.g., based on RSSI measurements).

After reversing the mobile transmit and receive frequencies, the processor 150 of the mobile transceiver 100 generates a paging signal which is transmitted using the forward link set-up channel (Step 308). More specifically, as typically performed by a base station or MTSO, the processor 150 converts the telephone number input by the user via the keypad of the handset 200 (i.e., a 10-digit telephone number having a 3-digit area code plus a 7-digit directory number) to an N-bit binary mobile identification number which is used to identify a mobile subscriber to a base station or MTSO. As discussed above, when the second mobile 50-2 is turned on, it initially scans assigned forward link set-up channels for surrounding base stations, and selects a single base station to be the serving base station based on relative channel quality. Therefore, the processor 150 of the first mobile 50-1 can assume that the second mobile 50-2 is tuned to the same forward link set-up channel as the first mobile 50-1 (i.e., the forward link set-up channel associated with the base station 14-3 in this example) because, when the first and second mobiles 50-1 and 50-2 are in range for direct communication, they will generally be served by the same base station. Alternatively, the controller 150 may attempt to page the second mobile 50-2 using the forward link set-up channels designated for adjacent base stations.

When the second mobile 50-2 recognizes its page over the forward link set-up channel, it responds over the reverse link set-up channel (e.g., an access channel) as it would for a normal response to a page from a base station (Step 310). Upon receiving a response from the second mobile 50-2 over the reverse link set up channel, the transceiver 100 of the first mobile 50-1 transmits an indication of the selected traffic channel previously determined in accordance with the communication channel or frequency sweep operation discussed above. The first mobile 50-1 transmits this traffic channel selection to the second mobile 50-2 via the forward link set-up channel (Step 312). After receiving an indication that the second mobile 50-2 has tuned to the designated traffic channel (e.g., using a looped supervisory audio tone (SAT)), the processor 150 of the first mobile 50-1 recognizes that a connection has successfully been established, and transmits a data message over the forward link traffic channel alerting the second mobile 50-2 of an incoming call, which causes the second mobile 50-2 to provide an audible alert to the user. When the second mobile 50-2 goes "off-hook," the processor 150 of the first mobile 50-1 recognizes the off-hook state of the second mobile 50-2, and communication between the first mobile 50-1 and the second mobile 50-2 over the assigned traffic channel commences (Step 314). If the processor 150 determines that a call cannot be established, for example if the second mobile is not turned on or not in the local calling range, the processor 150 may output a signal to the display 212 of the handset 200, indicating to the user that a local connection cannot be established. Thus, the user may then attempt to indirectly contact the second mobile by selecting the normal operation select button 214, in which case a call is established, if possible, through the wireless network infrastructure, i.e., via the MTSO and base stations.

As described above, the transceiver 100 of the first mobile 50-1 establishes a call connection with the second mobile 50-2 using the forward link set-up channel which would be used by the serving base station. In this way, the transceiver 100 of the first mobile 50-1 performs like a base station by transmitting/receiving control information and traffic using base station transmit/receive frequencies.

During direct communication between the first mobile 50-1 and the second mobile 50-2, the processor 150 monitors the quality of voice communication, for example by monitoring signal-to-noise ratio or bit error rate (Step 316), and detects any situation where call quality drops below a threshold level (Step 318). When the processor 150 determines that call quality has dropped below a threshold level, the processor 150 initiates another communication channel or frequency sweep operation to select a new traffic channel (Step 320), and subsequently transmits the selected traffic channel to the second mobile using the forward link set-up channel (Step 312). In this way, the processor 150 minimizes interference during direct communication between the first and second mobiles.

As described above, a transceiver of a mobile telephone is modified to perform like a network station during a local calling mode. In this way, a call can be completed between a first mobile and a second mobile without involving a base station or the MTSO, and thereby avoiding the allocation of network resources and network charges. Furthermore, as described above, the transceiver of the mobile can perform a traffic channel selecting operation during initial call set-up and during voice communication to prevent interference.

It should be apparent to those skilled in the art that various modifications and applications of this invention are contemplated which may be realized without departing from the spirit and scope of the present invention.

What is claimed is:

1. A method for a first mobile telephone to communicate with a second mobile telephone in a wireless communication system, comprising:

directly transmitting call set-up information from a first mobile telephone over a forward link control channel to a second mobile telephone to establish a direct call connection between said first mobile telephone and said second mobile telephone; and transmitting traffic from said first mobile telephone directly to said second mobile telephone using a first frequency band, the first frequency band being used by a base station of the wireless communication system to transmit traffic; and receiving traffic directly from said second mobile telephone at said first mobile telephone using a second frequency band, the second frequency band being used by said base station to receive traffic.

2. The method of claim 1, wherein said step of establishing a call connection includes:

selecting a traffic channel and transmitting from said first mobile telephone an indication of the selected traffic channel over said forward link control channel.

3. The method of claim 1, further comprising:

monitoring call quality at said first mobile telephone; and selecting a new traffic channel when said monitoring step indicates that call quality has deteriorated below a threshold.

4. The method of claim 1, wherein said call set-up information includes a paging signal.

5. The method of claim 1, wherein a network base station assigns an idle traffic channel to be used during direct communication between said first and second mobile telephones.

6. A communication method comprising:

establishing a direct call connection between a first mobile telephone and a second mobile telephone by transmitting call set-up information from said first mobile telephone over a forward link control channel; and performing at least one of the following:

transmitting traffic from said first mobile telephone using a base station frequency band, and receiving traffic at said first mobile telephone using a base station frequency band, wherein said step of establishing a call connection includes selecting a traffic channel and transmitting from said first mobile telephone an indication of the selected traffic channel over said forward link control channel, wherein said selecting step includes:

performing a frequency sweep operation at said first mobile telephone to select the traffic channel to be used.

7. The method of claim 6, wherein said frequency sweep operation identifies an idle traffic channel to be used during direct communication between said first and second mobile telephones.

8. A mobile telephone for use in a wireless communication system, comprising:

transmitting/receiving means for directly transmitting call set-up information over a forward link control channel to a second mobile telephone and receiving control information over a reverse link control channel to establish a direct call connection with said second mobile telephone; and control means for controlling said transmitting/receiving means, during said local calling mode, to directly transmit traffic to said second mobile telephone using a first frequency band, the first frequency band being used by a base station in the wireless communication system to transmit traffic, and to receive traffic directly from said second mobile telephone using a second frequency band, the second frequency band being used by said base station to receive traffic.

9. The mobile telephone of claim 8, wherein said transmitting/receiving means includes:

a duplexer having a first band pass filter for removing frequency components outside a mobile transmit frequency band, and a second band pass filter for removing frequency components outside a mobile receive frequency band.

10. The mobile telephone of claim 9, wherein said control means comprises:

a first switch for setting respective inputs to said first and second band pass filters during said local calling mode so that said second band pass filter receives radio frequency (RF) transmit signals and said first band pass filter outputs RF reception signals.

11. The mobile telephone of claim 10, wherein said transmitting/receiving means further comprises:
- a first frequency synthesizer for generating a first oscillating signal;
- a second frequency synthesizer for generating a second oscillating signal; and
- a mixer for down converting an RF reception signal in accordance with an oscillating signal received from one of said first and second frequency synthesizers; and said control means further comprises:
- a second switch for selectively connecting said mixer to receive said first oscillating signal from said first frequency synthesizer during a normal operating mode and connecting said mixer to receive said second oscillating signal from said second frequency synthesizer during said local calling mode.

12. The mobile telephone of claim 8, wherein said control means selects a traffic channel and controls said transmitting/receiving means to transmit an indication of the selected traffic channel over said forward link control channel.

13. The mobile telephone of claim 8, wherein said control means monitors call quality during said local calling mode and selects a new traffic channel when call quality has deteriorated below a threshold.

14. The mobile telephone of claim 8, wherein said call set-up information includes a paging signal.

15. The mobile telephone of claim 8, wherein a network base station assigns a traffic channel to be used during direct communication with said second mobile telephone.

16. A mobile telephone comprising:

transmitting/receiving means for transmitting call set-up information over a forward link control channel and receiving control information over a reverse link control channel to establish a direct call connection with a second mobile telephone; and control means for controlling said transmitting/receiving means, during said local calling mode, to do at least one of the following:
- transmit traffic using a base station transmit frequency band, and
- receive traffic using a base station receive frequency band, wherein said control means selects a traffic channel and controls said transmitting/receiving means to transmit an indication of the selected traffic channel over said forward link control channel, wherein said control means selects a traffic channel in accordance with a frequency sweep operation.

17. The mobile telephone of claim 16, wherein said frequency sweep operation identifies an idle traffic channel to be used during communication between said first and second mobile telephones during said local calling mode.

* * * * *